(12) United States Patent
Jung et al.

(10) Patent No.: US 8,649,356 B2
(45) Date of Patent: Feb. 11, 2014

(54) METHOD OF RELIABLE HANDOVER SIGNALING PROCEDURE IN A BROADBAND WIRELESS ACCESS SYSTEM

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 13/257,591

(22) PCT Filed: Mar. 19, 2010

(86) PCT No.: PCT/KR2010/001718
§ 371 (c)(1),
(2), (4) Date: Sep. 20, 2010

(87) PCT Pub. No.: WO2010/107278
PCT Pub. Date: Sep. 23, 2010

(65) Prior Publication Data
US 2012/0014355 A1    Jan. 19, 2012

Related U.S. Application Data

(60) Provisional application No. 61/233,484, filed on Aug. 12, 2009, provisional application No. 61/161,770, filed on Mar. 20, 2009.

(30) Foreign Application Priority Data

Mar. 19, 2010 (KR) ................. 10-2010-0024722

(51) Int. Cl.
*H04W 4/00* (2009.01)
(52) U.S. Cl.
USPC .......................................... 370/331

(58) Field of Classification Search
USPC .................. 370/328–336, 338; 455/421–444
See application file for complete search history.

(56) References Cited

U.S. PATENT DOCUMENTS

| | | | |
|---|---|---|---|
| 5,920,817 A * | 7/1999 | Umeda et al. | 455/437 |
| 8,254,959 B2 * | 8/2012 | Fix et al. | 455/456.1 |
| 8,355,728 B2 * | 1/2013 | Jung et al. | 455/444 |
| 2002/0181418 A1 * | 12/2002 | Awater et al. | 370/329 |
| 2007/0104143 A1 | 5/2007 | Hori | |
| 2007/0173256 A1 * | 7/2007 | Laroia et al. | 455/436 |
| 2008/0095092 A1 * | 4/2008 | Kim | 370/311 |

(Continued)

FOREIGN PATENT DOCUMENTS

| | | |
|---|---|---|
| EP | 0710425 | 11/2004 |
| KR | 1020060103106 | 9/2006 |
| KR | 1020100103352 | 9/2010 |

*Primary Examiner* — Asad Nawaz
*Assistant Examiner* — Syed S Ali
(74) *Attorney, Agent, or Firm* — Lee, Hong, Degerman, Kang & Waimey

(57) ABSTRACT

A method for determining whether a mobile station (MS) is present in coverage of a serving base station (SBS) during a handover process and an apparatus for carrying out the same, resulting in the implementation of more reliable handover, are disclosed. A method for controlling an MS to perform a presence check procedure during handover of a broadband wireless access system includes receiving a first signal for a presence check request from an SBS, and transmitting a second signal as a response to the presence check request to the SBS. Preferably, the first signal is received after the lapse of a first time indicating a deadline at which the MS performs network re-entry to a target base station (TBS).

3 Claims, 8 Drawing Sheets

(56) References Cited

U.S. PATENT DOCUMENTS

| | | | |
|---|---|---|---|
| 2009/0046637 A1* | 2/2009 | Kim et al. | 370/329 |
| 2009/0080351 A1* | 3/2009 | Ryu et al. | 370/312 |
| 2009/0180463 A1* | 7/2009 | Yang et al. | 370/349 |
| 2009/0232089 A1* | 9/2009 | Lott | 370/331 |
| 2009/0280813 A1* | 11/2009 | Bavois et al. | 455/436 |
| 2009/0296615 A1* | 12/2009 | Kim et al. | 370/311 |
| 2009/0296659 A1* | 12/2009 | Lim et al. | 370/331 |
| 2010/0040022 A1* | 2/2010 | Lindstrom et al. | 370/331 |
| 2010/0056148 A1* | 3/2010 | Kellil et al. | 455/436 |
| 2010/0062772 A1* | 3/2010 | Peng et al. | 455/436 |
| 2010/0178920 A1* | 7/2010 | Kitazoe et al. | 455/436 |
| 2011/0019641 A1* | 1/2011 | Chang et al. | 370/331 |
| 2011/0051668 A1* | 3/2011 | Lee et al. | 370/328 |
| 2011/0134888 A1* | 6/2011 | Lin et al. | 370/335 |
| 2012/0026893 A1* | 2/2012 | Zhang et al. | 370/242 |
| 2012/0315907 A1* | 12/2012 | Chin et al. | 455/436 |

\* cited by examiner

METHOD OF RELIABLE HANDOVER SIGNALING PROCEDURE IN A BROADBAND WIRELESS ACCESS SYSTEM

CROSS-REFERENCE TO RELATED APPLICATIONS

This application is the National Stage filing under 35 U.S.C. 371 of International Application No. PCT/KR2010/001718, filed on Mar. 19, 2010, which claims the benefit of earlier filing date and right of priority to Korean Application No. 10-2010-0024722, filed on Mar. 19, 2010, and also claims the benefit of U.S. Provisional Application Ser. Nos. 61/233,484, filed on Aug. 12, 2009 and 61/161,770, filed on Mar. 20, 2009, the contents of which are all incorporated by reference herein in their entirety.

TECHNICAL FIELD

The present invention relates to a broadband wireless access system, and more particularly to a method for determining whether a mobile station (MS) is present in coverage of a serving base station (SBS) during a handover process, and an apparatus for carrying out the same, resulting in the implementation of more reliable handover.

BACKGROUND ART

Handover (HO) refers to movement of a mobile station (MS) from a wireless interface of one base station (BS) to a wireless interface of another BS. Hereinafter, a handover procedure in a general IEEE 802.16e system will be described.

A Serving Base Station (SBS) in an IEEE 802.16e network may broadcast information about neighbor BSs through a mobile neighbor advertisement (MOB_NBR-ADV) message in order to inform an MS of information (topology) about basic network configuration.

The MOB_NBR-ADV message includes system information about a serving BS and neighbor BSs, for example, a preamble index, a frequency, a handover optimization possibility, downlink channel descriptor (DCD)/uplink channel descriptor (UCD) information, etc.

The DCD/UCD information includes information of which an MS should be aware in order to exchange information through downlink and uplink. For example, the DCD/UCD information includes handover (HO) trigger information, and medium access control (MAC) version and media independent handover (MIH) capability information of a BS.

A general MOB_NBR-ADV message includes information about neighbor BSs of an IEEE 802.16e type only. Accordingly, information about neighbor BSs of a type other than IEEE 802.16e may be broadcast to MSs through a service identity information advertisement (SII-ADV) message. As a result, an MS may acquire information about BSs of a heterogeneous network by requesting a serving BS to transmit the SII-ADV message.

A procedure for an MS having information about neighbor BSs obtained through the above-described method to perform handover in an IEEE 802.16e network will be described in more detail with reference to FIG. 1.

FIG. 1 illustrates an example of a handover (HO) procedure which can be performed in an IEEE 802.16e system.

Referring to FIG. 1, an MS exchanges data with a serving BS (SBS) at step S101.

The SBS periodically broadcasts information about neighbor BSs to the MS through a MOB_NBR-ADV message at step S102.

The MS may start scanning for candidate handover (HO) BSs using a handover (HO) trigger condition while communicating with the SBS. The MS requests the SBS to perform a handover procedure by transmitting a handover request (MOB_MSHO-REQ) message when a handover condition is satisfied, for example, when a predetermined hysteresis margin value is exceeded at step S103.

The SBS informs candidate handover (HO) BSs included in the MOB_MSHO-REQ message that the MS has requested handover through a handover request (HO-REQ) message at step S104.

The candidate handover BSs take action for the MS having requested handover to transmit information about handover to the SBS through a handover response (HO-RSP) message at step S105.

The SBS transmits the information about handover, obtained through the HO-RSP message from the candidate handover (HO) BSs, to the MS through a handover response (MOB_BSHO-RSP) message. The MOB_BSHO-RSP message may include information necessary to perform handover, that is, a handover action time, a handover identifier (HO-ID), and a dedicated handover (HO) code division multiple access (CDMA) ranging code at step S106.

The MS determines one target BS (TBS) among the candidate BSs based on the information included in the MOB-BSHO-RSP message received from the SBS. The MS then transmits a CDMA code to the determined TBS to attempt ranging at step S107.

The TBS receiving the CDMA code may inform the MS of success or failure of ranging and physical correction values through a ranging response (RNG-RSP) message at step S108.

The MS transmits a ranging request (RNG-REQ) message for authentication to the TBS at step S109.

The TBS receiving the RNG-REQ message from the MS transmits system information, which can be used in a corresponding BS, such as a connection identifier (CID) to the MS through a ranging response (RNG-RSP) message at step S110.

If the TBS successfully completes authentication of the MS and transmits all update information, the TBS informs the SBS of success or failure of handover through a handover completion (HO-CMPT) message at step S111.

Next, the MS exchanges data with the TBS which has performed handover at step S112.

The HO procedure for use in the IEEE 802.16m system is similar to the HO procedure for use in the IEEE 802.16e system. However, individual messages may be called in different ways as necessary.

MOB_NBR-ADV→AAI_NBR-ADV: Corresponding message may include not DCD/UCD formatted system information but S-SFH formatted system information.

MSHO-REQ→AAI_HO-REQ

BSHO-RSP→AAI_HO-CMD

RNG-REQ (CDMA code)→Ranging preamble code

RNG-RSP (ranging status)→AAI_RNG-ACK (ranging status)

RNG-REQ (MAC message)→AAI_RNG-REQ

RNG-RSP→AAI_RNG-RSP: Corresponding message may include a station identifier, such as a TSID or STID, instead of a CID.

Because of channel condition deterioration in the above-mentioned HO procedure, the MS or the SBS may unexpectedly lose an HO-related Medium Access Control (MAC)

management message (e.g., AAI_HO-CMD message) while attempting an HO action. In this case, the MS is unable to attempt HO to the TBS and at the same time is unable to receive scheduling information from the SBS after the lapse of a predetermined time.

DISCLOSURE OF INVENTION

Technical Problem

Accordingly, the present invention is directed to a method for performing a reliable handover procedure in a broadband wireless access system, that substantially obviate one or more problems due to limitations and disadvantages of the related art.

An object of the present invention devised to solve the problem lies on a method and apparatus for more effectively performing handover (HO).

Another object of the present invention devised to solve the problem lies on a method and apparatus for effectively confirming the presence or absence of a mobile station (MS) during an HO procedure that minimizes an interruption time although an HO-related AC management message is lost between a serving base station (SBS) and a mobile station (MS).

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Solution to Problem

The object of the present invention can be achieved by providing a method for controlling a mobile station (MS) to perform a presence check procedure during handover of a broadband wireless access system, the method including receiving a first signal for a presence check request from a serving base station (SBS), and transmitting a second signal as a response to the presence check request to the serving base station (SBS), wherein the first signal is received after the lapse of a first time indicating a deadline at which the mobile station (MS) performs network re-entry to a target base station (TBS).

If the target base station (TBS) does not inform the serving base station (SBS) of completion of the handover until the first time elapses, the serving base station (SBS) may transmit the first signal to the mobile station (MS).

The first signal may be an uplink (UL) grant signal including uplink allocation information, and the second signal may be a padding protocol data unit (PDU) or a MAC protocol data unit (MPDU) that is transmitted through uplink resources indicated by the uplink (UL) grant signal.

The first signal may be an unsolicited ranging response (unsolicited AAI_RNG-RSP) message in which a specific bit required for requesting a ranging process from the mobile station (MS) is established, and the second signal may be a periodic ranging code.

The method may further include receiving a ranging acknowledgement (AAI_RNG-ACK) message indicating a ranging success status from the serving base station (SBS), and transmitting a ranging confirmation (AAI_RNG-CFM) message including an identifier (ID) of the mobile station (MS) to the serving base station (SBS).

The first time may be indicative of a ranging initiation deadline (Ranging_Initiation_Deadline).

In another aspect of the present invention, provided herein is a method for controlling a serving base station (SBS) to perform a presence check procedure of a mobile station (MS) during handover of a broadband wireless access system, the method including transmitting a first signal for a presence check request to the mobile station (MS), and receiving a second signal as a response to the presence check request from the mobile station (MS), wherein the first signal is transmitted to the mobile station (MS) after the lapse of a specific time indicating a deadline at which the mobile station (MS) performs network re-entry to a target base station (TBS).

The transmitting of the first signal may be carried out when no handover completion notification message is received from the target base station (TBS) before the deadline passes.

The first signal may be an uplink (UL) grant signal including uplink allocation information, and the second signal may be a padding protocol data unit (PDU) or a MAC protocol data unit (MPDU).

The first signal may be an unsolicited ranging response (unsolicited AAI_RNG-RSP) message in which a specific bit required for requesting a ranging process from the mobile station (MS) is established, and the second signal may be a periodic ranging code.

The method may further include, if the code is successfully received, transmitting a ranging acknowledgement (AAI_RNG-ACK) message indicating a ranging success status to the mobile station (MS), and receiving a ranging confirmation (AAI_RNG-CFM) message including an identifier (ID) of the mobile station (MS) from the mobile station (MS).

The deadline may be indicative of a ranging initiation deadline (Ranging_Initiation_Deadline).

In another aspect of the present invention, provided herein is a mobile station (MS) operated in a broadband wireless access system, the mobile station (MS) including a processor, and a radio frequency (RF) module for transmitting and receiving an RF signal to and from an external part upon receiving a control signal from the processor, wherein the processor receives a first signal for a presence check request from a serving base station (SBS) and thus transmits a second signal as a response to the presence check request to the serving base station (SBS), wherein the first signal is received after the lapse of a first time indicating a deadline at which the mobile station (MS) performs network re-entry to a target base station (TBS).

The serving base station (SBS), if the target base station (TBS) does not inform the serving base station (SBS) of completion of the handover before the first time elapses, may transmit the first signal to the mobile station (MS).

The first signal may be an uplink (UL) grant signal including uplink allocation information, and the second signal may be a padding protocol data unit (PDU) or a MAC protocol data unit (MPDU) that is transmitted through uplink resources indicated by the uplink (UL) grant signal.

The first signal may be an unsolicited ranging response (unsolicited AAI_RNG-RSP) message in which a specific bit required for requesting a ranging process from the mobile station (MS) is established, and the second signal may be a periodic ranging code.

Upon receiving a ranging acknowledgement (AAI_RNG-ACK) message indicating a ranging success status from the serving base station (SBS), the processor may transmit a ranging confirmation (AAI_RNG-CFM) message including an identifier (ID) of the mobile station (MS) to the serving base station (SBS).

The first time may be indicative of a ranging initiation deadline (Ranging_Initiation_Deadline).

Advantageous Effects of Invention

The exemplary embodiments of the present invention have the following effects.

First, more reliable handover (HO) can be carried out because an interruption time is minimized.

Second, a serving base station (SBS) confirms the presence or absence of a mobile station (MS) even if a MAC message is lost between the SBS and the MS during an HO procedure, resulting in the implementation of a more reliable HO procedure.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Figure 1:
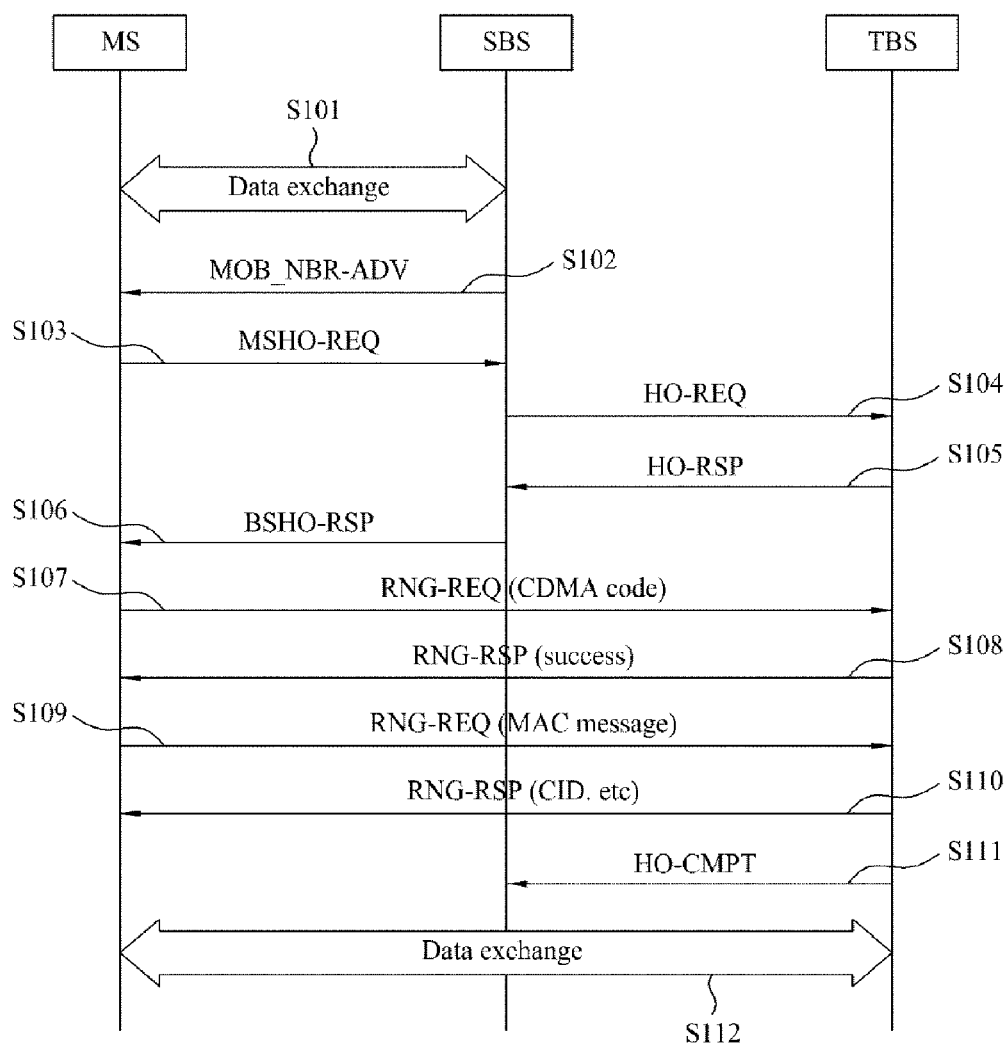
FIG. 1 is a flowchart illustrating a handover (HO) procedure for use in an Institute of Electrical and Electronics Engineers (IEEE) 802.16e system.

Exemplary embodiments of the present invention provide a variety of methods and apparatuses for performing an efficient and reliable handover.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be re-arranged. Some constructions or features of any one embodiment may be included in another embodiment and may be replaced with corresponding constructions or features of another embodiment.

In the exemplary embodiments of the present invention, a description is made of a data transmission and reception relationship between a base station (BS) and a mobile station (MS). Here, the BS refers to a terminal node of a network communicating directly with the MS. In some cases, a specific operation described as performed by the BS may be performed by an upper node of the BS.

Namely, in a network comprised of a plurality of network nodes including a BS, various operations performed for communication with an MS may be performed by the BS, or network nodes other than the BS. The BS may be replaced with the term 'fixed station', 'Node B', 'eNode B (eNB)', 'access point (AP)', 'Advanced BS (ABS)', etc. The MS may be replaced with the term 'user equipment (UE)', 'terminal', 'mobile subscriber station (MSS)', 'Advanced MS (AMS)', 'subscriber station (SS)', etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The embodiments of the present invention can be supported by standard documents disclosed in at least one of the IEEE 802 system, 3GPP system, 3GPP LTE system, and 3GPP2 system which are radio access systems. That is, steps or portions that are not described in the embodiments of the present invention for the sake of clearly describing the spirit of the present invention may be supported by the above documents. For all terms used in this disclosure, reference can be made to the above standard documents. Especially, the embodiments of the present invention may be supported by at least one of P802.16-2004, P802.16e-2005, and P802.16Rev2 which are standard documents of the IEEE 802.16 system.

The specific terms described in the following description are provided to aid the understanding of the present invention and these terms may be changed without departing from the spirit of the present invention.

A handover (HO) procedure for use in the IEEE 802.16m system will hereinafter be described in detail.

In the IEEE 802.16m system, an HO procedure may largely involve (1) HO decision and initiation, (2) HO preparation, and (3) HO execution. Before performing these three procedures, an AMS needs to perform a scanning procedure in which it collects information about neighbor Advanced Base Stations (ABSs). The scanning procedure is similar to the scanning procedure in the IEEE 802.16e network. For example, when there is a non-communication period in which the AMS does not communicate with a Serving ABS (S-ABS), the AMS may scan neighbor ABSs during the non-communication period.

In the HO decision and initiation procedure, either the AMS or the S-ABS may initiate HO. If the AMS initiates HO, the AMS transmits a handover request (AAI_HO-REQ) message to the SBS. In this case, the AMS determines whether to perform an Entry Before Break (EBB) handover according to a decision signal of the ABS.

In the HO preparation procedure, AMS information is exchanged between the S-ABS and the T-ABS. Thereafter, a condition of the HO execution procedure and resources (e.g., dedicated code, STID, security parameters, etc.) to be allocated to the AMS are negotiated between the S-ABS and the T-ABS. The S-ABS may give a plurality of T-ABSs to the ABS according to conditions. If the AMS performs initiation, it requests HO through the AAI-HO-REQ message, and receives the above-mentioned information from the ABS through the AAI_HO-CMD message. In this case, the AAI_HO-CMD message may further include action time and disconnect time parameters. The action time parameter indicates a time when the AMS is supposed to perform network re-entry and the disconnect time parameter indicates a time when the S-ABS is supposed to release downlink and uplink (DL/UL) resources from the AMS.

The HO execution procedure may be carried out at a time indicated by the action time parameter. That is, the AMS may perform a network re-entry procedure to the T-ABS at the time indicated by the action time parameter. In this case, the AMS may transmit a CDMA ranging message or an AAI_RNG-REQ message to the T-ABS at the action time to perform the network re-entry procedure. In case of Entry Before Break (EBB), the AMS may continuously communicate with the S-ABS during a predetermined Available Interval (AI). Meanwhile, during an Un-Available Interval (UAI), the AMS may perform the network re-entry to the T-ABS. On the other hand, in case of Break Before Entry (BBE), the AI or the UAI is not determined. Therefore, the AMS operates in the same manner as for hard HO in a general IEEE 802.16e network.

The above-mentioned HO procedure will hereinafter be described in detail with reference to FIG. 2.

Figure 2:
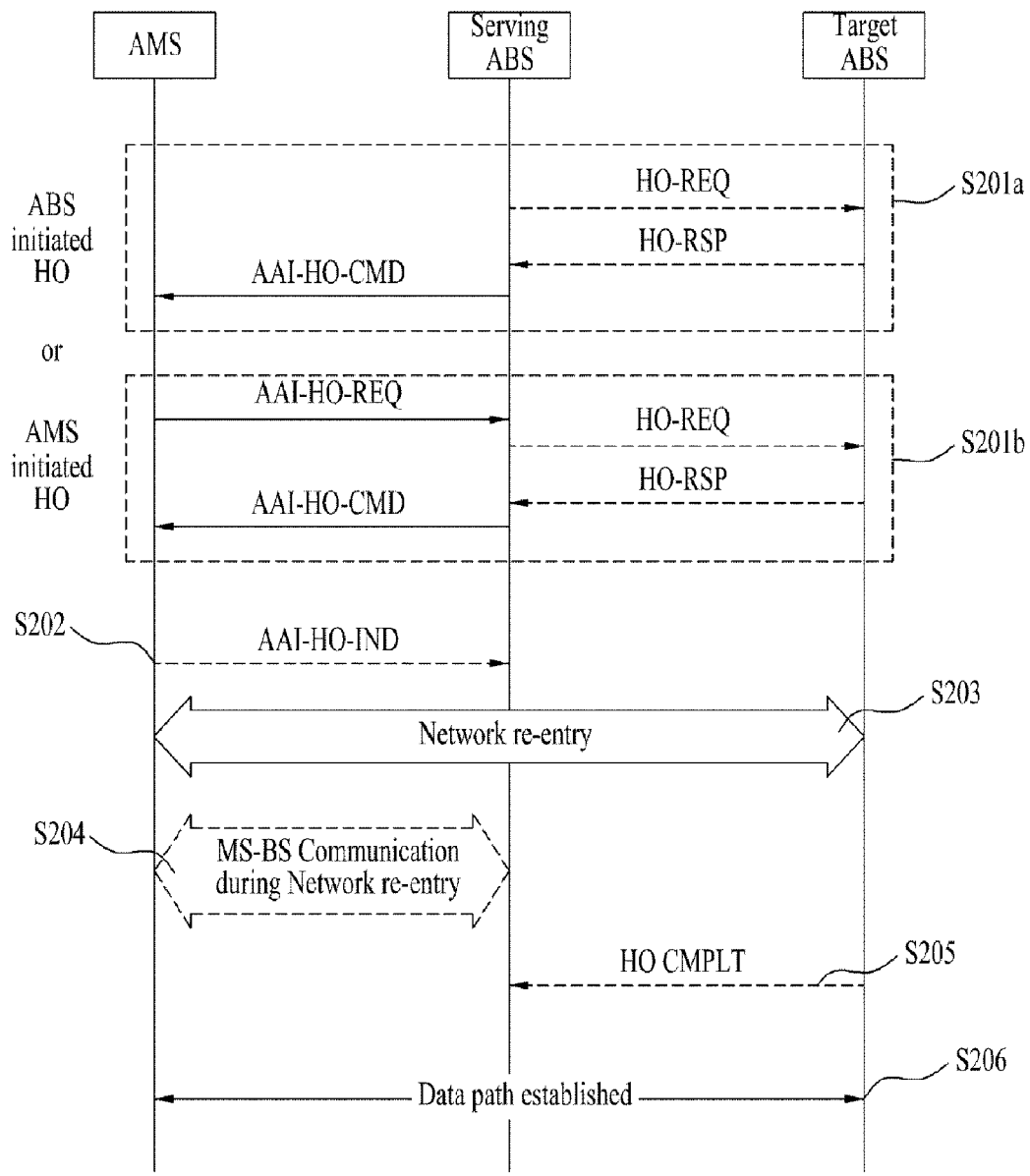
FIG. 2 is a flowchart illustrating an HO procedure for use in a general IEEE 802.16m system.

FIG. 2 is a flowchart illustrating an HO procedure for use in a general IEEE 802.16m system.

Referring to FIG. 2, the HO procedure may be initiated by the SBS at step S201a, or may also be initiated by the AMS at step S201b. In the case where the AMS initiates an HO procedure, the AMS may transmit an HO request (AAI_HO-REQ) message so as to request the SBS to perform HO, but the SBS may also initiate the HO procedure without receiving a corresponding message from the AMS.

Upon receiving an HO command (AAI_HO-CMD) message from the serving ABS, the AMS may selectively transmit the HO indication (AAI_HO-IND) message to the serving ABS at step S202. The AMS can transmit the AAI_HO-IND message to the serving ABS under the following conditions 1)~4). Detailed descriptions of such conditions 1)~4) are as follows.

1) First Condition: First condition is provided when the AMS desires to cancel HO on the basis of conditions decided by the serving ABS (S-ABS).

2) Second Condition: Second condition is provided when the number of candidate target ABSs present in the AAI_HO-CMD message is plural and the AMS selects any one of the candidate target ABSs.

3) Third Condition: Third condition is provided when it is impossible to access all candidate target ABSs contained in the AAI_HO-CMD message.

4) Fourth Condition: Fourth condition is provided when it is impossible to maintain a connection to the serving ABS prior to the expiration of a disconnect time.

Thereafter, the AMS performs network re-entry to the target ABS at step S203.

If the EBB handover (HO) may be carried out or if the serving ABS performs scheduling prior to the expiration of a disconnect time, the AMS may communicate with the serving ABS in the network re-entry procedure at step S204.

If the network re-entry is completed, the target ABS informs the serving ABS of HO completion at step S205. The AMS may normally communicate with the target ABS at step S206.

In the above-mentioned HO procedure, the AMS transmits the handover request (AAI_HO-REQ) message to the serving ABS so as to initiate the HO procedure. The serving ABS transmits an HO command (AAI_HO-CMD) message to the AMS, such that it commands the AMS to perform HO. In this case, if the AMS or ABS has not successfully transmitted or received the HO-related MAC management message, an unexpected problem may occur in the HO procedure.

For example, if the AMS initiates HO, HO is initiated through transmission of the AAI_HO-REQ message. If the AMS receives the AAI_HO-CMD message from the Serving ABS (S-ABS), HO is carried out in earnest. In this case, if the AAI_HO-CMD message is lost such that the AMS does not receive the AAI_HO-CMD message, the ABS retransmits the AAI_HO-CMD message or retransmits the AAI_HO-REQ message, such that the stability of the HO procedure can be guaranteed to carry out normal HO.

However, if the ABS commands HO (i.e., BS initiated HO) or if the AMS does not normally receive the AAI_HO-CMD message from the ABS, a serious problem may occur during HO. The AAI_HO-CMD message may include information about the disconnect time at which the serving ABS stops scheduling of the corresponding AMS while in an HO mode. If the AMS does not receive the AAI_HO-CMD message, it is impossible for the AMS to perform scheduling (i.e., resource allocation) after the lapse of the disconnect time. The AMS does not know whether such a condition is derived from the HO procedure. Accordingly, the AMS operation needs to be defined.

In addition, if the AMS performs network re-entry to the target ABS and the HO procedure is completed, the target ABS informs the serving ABS of HO completion through a backbone network (i.e., backhaul), such a backhaul message may have a relatively long delay. Therefore, in order to prevent waste of resources to be allocated to a corresponding AMS before reaching the disconnect time, a method for allowing the serving ABS to quickly determine whether no more AMSs are present in coverage of the serving ABS is needed.

In addition, after the AMS initiates HO, if the AAI_HO-REQ message transmitted from the AMS to the serving ABS is lost such that the ABS does not normally receive the AAI_HO-REQ message, it is necessary for the additional operations of the AMS to be defined.

AMS Presence Check

In accordance with one embodiment of the present invention, a method for allowing the serving ABS to check the presence or absence of the AMS in order to prepare for an exemplary case where the AAI_HO-CMD message is lost will be described in detail.

In other words, irrespective of whether the AAI_HO-CMD message has been successfully received, the serving ABS may stop communicating with the AMS according to the disconnect time. Accordingly, the AMS does not receive the scheduling service from the serving ABS after the lapse of the disconnect time, and the AMS is not aware of a cause of the above-mentioned situation, such that an unexpected problem occurs.

Therefore, in order to avoid the above-mentioned problem, this embodiment provides a method for allowing the serving ABS (S-ABS) to determine whether the AMS receives the AAI-HO-CMD message or is present in coverage of the S-ABS. For convenience of description and better understanding of the present invention, a method for checking the presence or absence of the AMS or determining whether the AAI-HO-CMD message is received is referred to as 'Presence Check Method'.

1) Presence Check Method

A detailed method for carrying out the presence check method according to embodiments of the present invention can be carried out through one procedure for controlling the serving ABS to request the presence check from the AMS and the other procedure for receiving a response to the request from the AMS.

In order to request the presence check procedure, the serving ABS may transmit the MAC message to the AMS or assign an uplink (UL) grant message to the AMS.

If the UL grant message is used, the AMS transmits a padding protocol data unit (hereinafter referred to as 'PDU') or a MAC PDU (MPDU) to the serving ABS through uplink resources indicated by the UL grant message so as to answer the UL grant message, such that the presence check procedure can be carried out.

As another example of the UL grant message, the serving ABS may assign the UL grant message for a bandwidth request (BR) (UL grant for BR) to the AMS. The AMS may transmit the BR code to the serving ABS so as to answer the above UL grant message, such that the presence check procedure can be carried out.

In order to request ranging as a response of the AMS when the AMC message is used, an unsolicited AAI_RNG-RSP message in which a ranging request bit is set to a specific number (e.g., a value of '1') may be used. Upon receiving the unsolicited AAI_RNG-RSP message from the serving ABS, the AMS may perform a ranging process to answer the received unsolicited AAI_RNG-RSP message. In this case, the ranging performed by the AMS may be preferably determined to be periodic ranging. In order to perform periodic ranging, the AMS may transmit the periodic ranging code to the serving ABS. Upon receiving the periodic ranging code from the AMS, the serving ABS may further transmit a ranging acknowledgement (AAI_RNG-ACK) message to the AMS. In this case, the AAI_RNG-ACK message may include specific information indicating a ranging success status and a periodic ranging code transmitted from the AMS. Upon receiving the AAI_RNG-ACK message from the serving ABS, the AMS may request uplink resource allocation, and transmit a ranging confirmation (AAI_RNG-CFM) message as a response to the AAI_RNG-ACK message to the serving ABS. In this case, the AAI_RNG-CFM message may include a station identifier (STID) of the AMS. If it is assumed that the AAI_RNG-CFM message includes a MAC control extended header (MCEH) having a polling bit of 1, the serving ABS may further transmit the AAI_MSG-ACK message to the AMS.

As another example of the MAC message, a message (e.g., AAI_PCHECK-REQ/RSP) that is newly defined to perform the presence check may be used.

The above-mentioned presence check procedure may be used separately or together. For example, the serving ABS may first assign the UL grant message to perform the presence check procedure. After the serving ABS assigns the UL grant message a predetermined number of times, if the serving ABS receives no response from the AMS, the serving ABS may perform the presence check procedure using the MAC message. In addition, in the presence check procedure using the MAC message, some messages may be omitted as necessary.

2) Time for Performing Presence Check Procedure

The problem caused by interruption of scheduling on the AMS may be encountered after the lapse of a disconnect time, such that it is preferable that the serving ABS check whether the AMS has successfully received the AAI_HO-CMD message after the lapse of the disconnect time, but it should be noted that the serving ABS may also check the success or failure of receiving the AA_HO-CMD message in the AMS prior to the disconnect time.

Otherwise, during handover (HO), a ranging initiation deadline (Ranging_Initiation_Deadline) for indicating a deadline where the target ABS expects to receive the RNG-REQ message for network re-entry from the AMS performing HO is established. The Ranging_Initiation_Deadline is already recognized by the serving ABS. Therefore, upon receiving no HO completion notification message from the backhaul from the target ABS after the Ranging_Initiation_Deadline has elapsed, the serving ABS may initiate the presence check procedure.

As another time point for initiating the presence check procedure, if the AMS receives the handover (AAI_HO-CMD) message, it is necessary for a response message (e.g., AAI_HO-IND message) to the AAI_HO-CMD message to be transmitted to the serving ABS within a predetermined time. Therefore, if the serving ABS does not receive the AAI_HO-IND message from the AMS within a predetermined time after having transmitted the AAI_HO-CMD message to the AMS, the serving ABS may initiate the presence check procedure. A more detailed procedure based on the above response message to the AAI_HO-CMD message will hereinafter be described in detail.

On the other hand, if there is no Hybrid Automatic Repeat Request (HARM) response to the MPDU having the MAC message (i.e., AAI_HO-CMD) or if a negative acknowledgement (NACK) signal is received although the maximum number of re-transmission times has been reached, the serving ABS may perform the presence check procedure.

It is preferable that the above-mentioned presence check procedure be carried out when the S-ABS indicates the HO (BS initiated HO) in the HO procedure. In the HO initiated by the AMS, the AMS expects to receive the AAI_HO-CMD message, such that the above-mentioned presence check procedure is carried out when the S-ABS indicates the HO.

However, if required, the embodiment of the present invention may also perform the presence check procedure during the AMS initiated HO.

3) Detailed Embodiments

The presence check procedure according to one embodiment of the present invention will hereinafter be described with reference to FIGS. 3 to 7.

Figure 3:
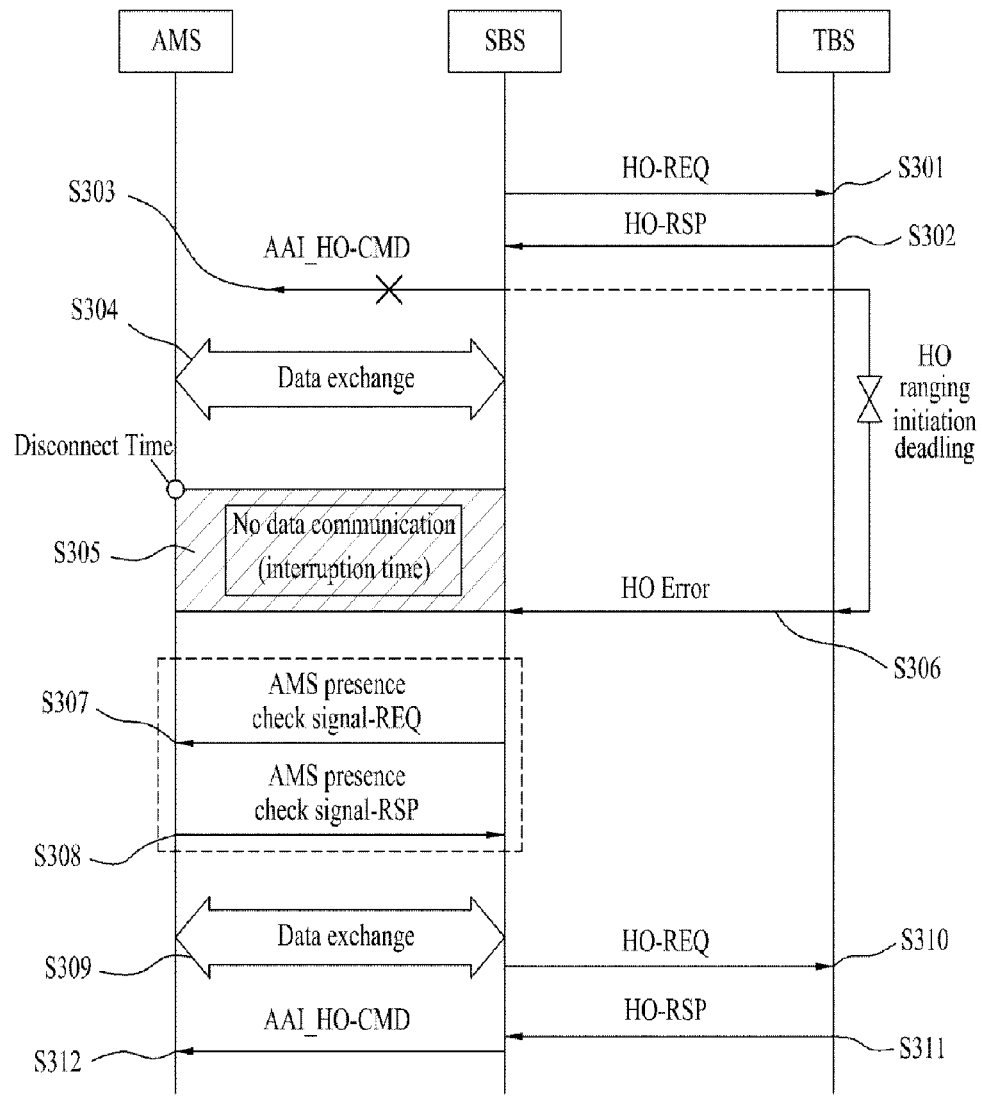
FIG. 3 is a flowchart illustrating a presence check procedure according to one embodiment of the present invention.

FIG. 3 is a flowchart illustrating a presence check procedure according to one embodiment of the present invention.

Referring to FIG. 3, the serving base station (SBS) may determine whether to perform handover (HO) of the AMS according to a predetermined condition, such that the HO-REQ message and the HO-RSP message may be exchanged with the target base station (TBS) at steps S301 and S302.

The SBS may transmit a handover (HO) command (AAI_HO-CMD) message to the AMS to command the AMS to perform HO, but the AMS does not successfully receive the AAI_HO-CMD message at step S303.

Therefore, the AMS can receive a normal scheduling service from the SBS until reaching the disconnect time at step S304. Thereafter, the AMS unavoidably experiences the interruption time during which no scheduling service is received from the SBS at step S305.

On the other hand, the AMS does not know the HO procedure initiated by the BS, such that it may not transmit a ranging request (RNG-REQ) message to the TBS even though the Ranging_Initiation_Deadline has expired. Therefore, the TBS may inform the SBS of the HO failure through a backbone network (backhaul).

Since the TBS informs the SBS of the HO failure, the SBS performs the presence check procedure and requests the AMS to perform the presence check procedure at step (S307). If the AMS generates a response to the presence check procedure request at step S308, the SBS may resume or restart the scheduling of the AMS at step S309.

In this case, a method for performing a detailed presence check procedure is equal to the above-mentioned method, and as such a detailed description thereof will herein be omitted.

Thereafter, in order to command the AMS to perform the HO, the SBS may exchange the HO-REQ message with the TBS at step S310 and then exchange the HO-RSP message with the TBS at step S311. As a result, the SBS may transmit the AAI_HO-CMD message to the AMS. In this case, the HO procedure is restarted, such that it is preferable that the disconnect time and the Ranging_Initiation_Deadline be updated to new values, respectively.

If the AMS outputs no response to the presence check request at step S307, the SBS initiates a resource retain timer. If the resource retain timer expires, connection information (context) of a corresponding AMS may be released. When the corresponding AMS re-enters the SBS or receives an HO completion notification message from another BS, the resource retain timer may be released.

Hereinafter, referring to FIGS. 4 to 6, in the case where the AMS transmits a response message to the AAI_HO-CMD message and the response message is not received in the SBS, the SBS may perform the presence check procedure as follows.

First, when the presence check procedure is carried out before reaching the Ranging_Initiation_Deadline, the following operations can be carried out, and detailed descriptions thereof will hereinafter be described with reference to FIG. 4.

Figure 4:
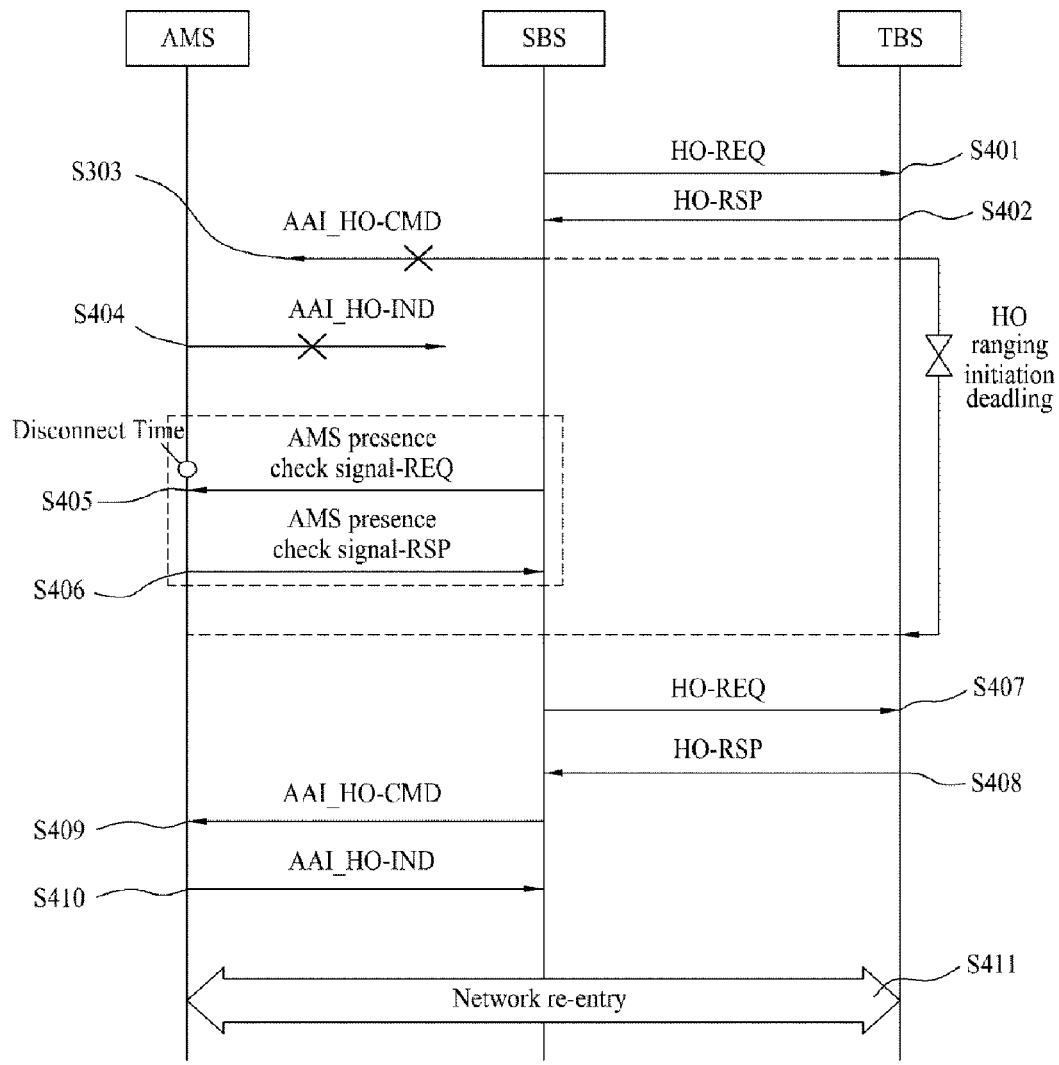
FIG. 4 is a flowchart illustrating one example of a presence check procedure when a response message for an HO indication message is requested according to one embodiment of the present invention.

FIG. 4 is a flowchart illustrating one example of a presence check procedure when a response message for an HO indication (AAI_HO-CMD) message is requested according to one embodiment of the present invention.

Referring to FIG. 4, the SBS may decide whether to perform an HO of the AMS according to a predetermined condition, such that the HO-REQ message and the HO-RSP message may be exchanged with the TBS at steps S401 and S402.

The SBS may transmit the AAI_HO-CMD message to the AMS so as to command the AMS to perform HO, but the AMS does not successfully receive the AAI_HO-CMD message at step S403. In this case, as a response to the AAI_HO-CMD message, the AMS may always transmit a specific MAC message (e.g., AAI_HO-IND) message) to the SBS. Otherwise, if a specific bit indicating such a response is established in the AAI_HO-CMD message, the SBS may expect to receive a corresponding MAC message from the AMS.

However, since the AMS does not receive the AAI_HO-CMD message, it does not transmit a response message such as the AAI_HO-IND message to the SBS at step S404.

If the SBS does not receive a response message to the AAI_HO-IND message before a specific time is reached (e.g., disconnect time), the presence check procedures may be carried out at steps S405 and S406.

If the presence check procedures have been successfully completed, the SBS may restart the HO procedure. That is, the SBS exchanges HO-related information with the TBS at steps S407 and S408, and retransmits the AAI_HO-CMD message to the AMS at step S409. The AMS successfully receives the AAI_HO-CMD message, and transmits a response message (that is, AAI_HO-IND message) to the AAI_HO-CMD message to the SBS at step S410.

Thereafter, the AMS may perform network re-entry to the TBS at step S411.

On the other hand, the presence check procedure may be carried out after the lapse of the Ranging_Initiation_Deadline.

Figure 5:
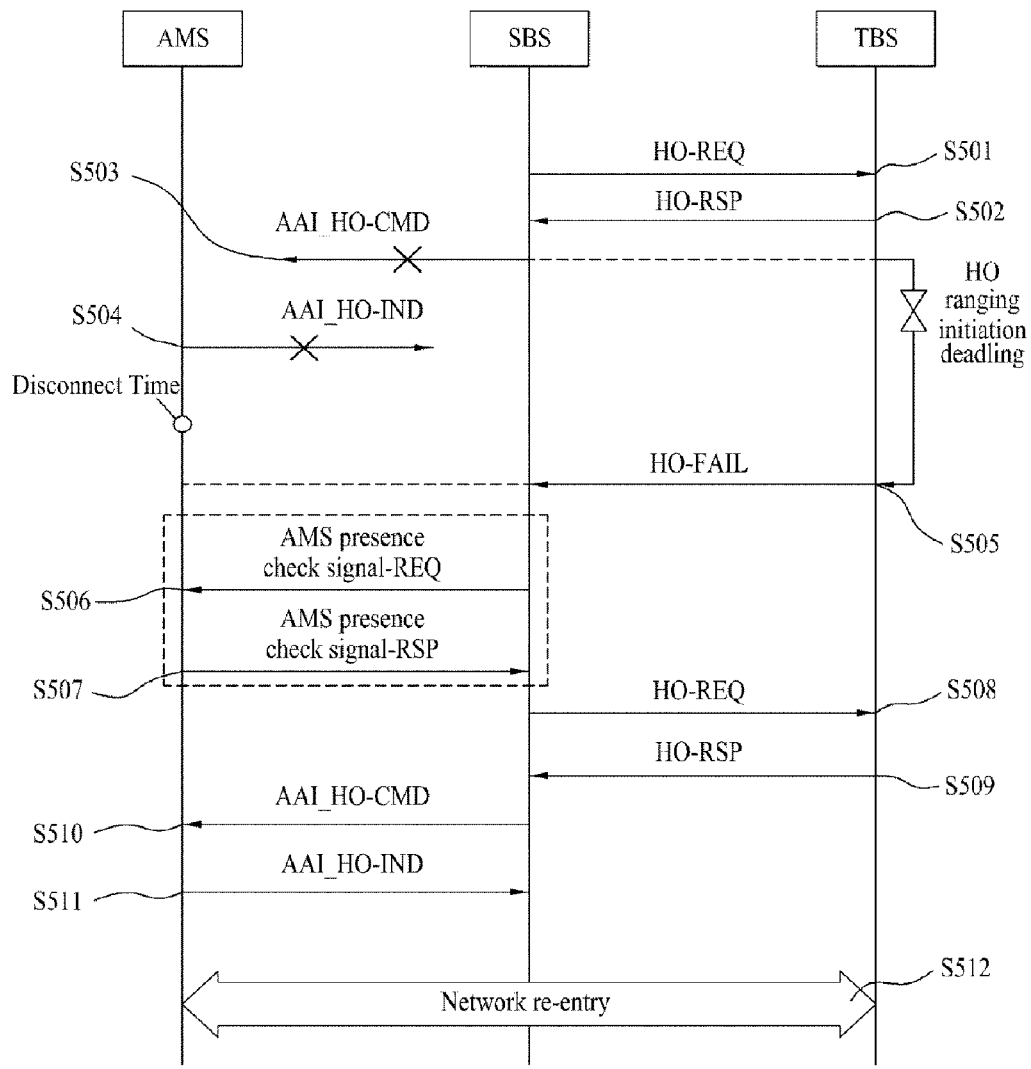
FIG. 5 is a flowchart illustrating another example of a presence check procedure when a response message for an HO indication message is requested according to one embodiment of the present invention.

FIG. 5 is a flowchart illustrating another example of a presence check procedure when a response message for an HO indication (AAI_HO-IND) message is requested according to one embodiment of the present invention.

Referring to FIG. 5, steps S501 to S504 are similar to other steps S401 to S404, and as such the same parts will herein be omitted for convenience of description.

The AMS does not receive the AAI_HO-CMD message, such that it does not attempt to perform ranging to the TBS until reaching the Ranging_Initiation_Deadline. If a current time reaches the Ranging_Initiation_Deadline, the TBS may inform the SBS of the HO failure through a backbone network (backhaul) at step S505.

When the TBS informs the SBS of the HO failure, or when the Ranging_Initiation_Deadline passes, if there is no HO completion notification message, the SBS may perform the presence check procedures at steps S506 and S507.

Steps S508 to S512 to be performed after the presence check procedure has been successfully completed are similar to other steps S407 to S411 of FIG. 4, and as such the same parts of FIG. 5 will herein be omitted for convenience of description.

On the other hand, if the SBS does not receive a response message to the AAI_HO-IND message from the AMS, the SBS may repeatedly retransmit the AAI_HO-IND message a predetermined number of times, and a detailed description thereof will hereinafter be described in detail with reference to FIG. 6.

Figure 6:
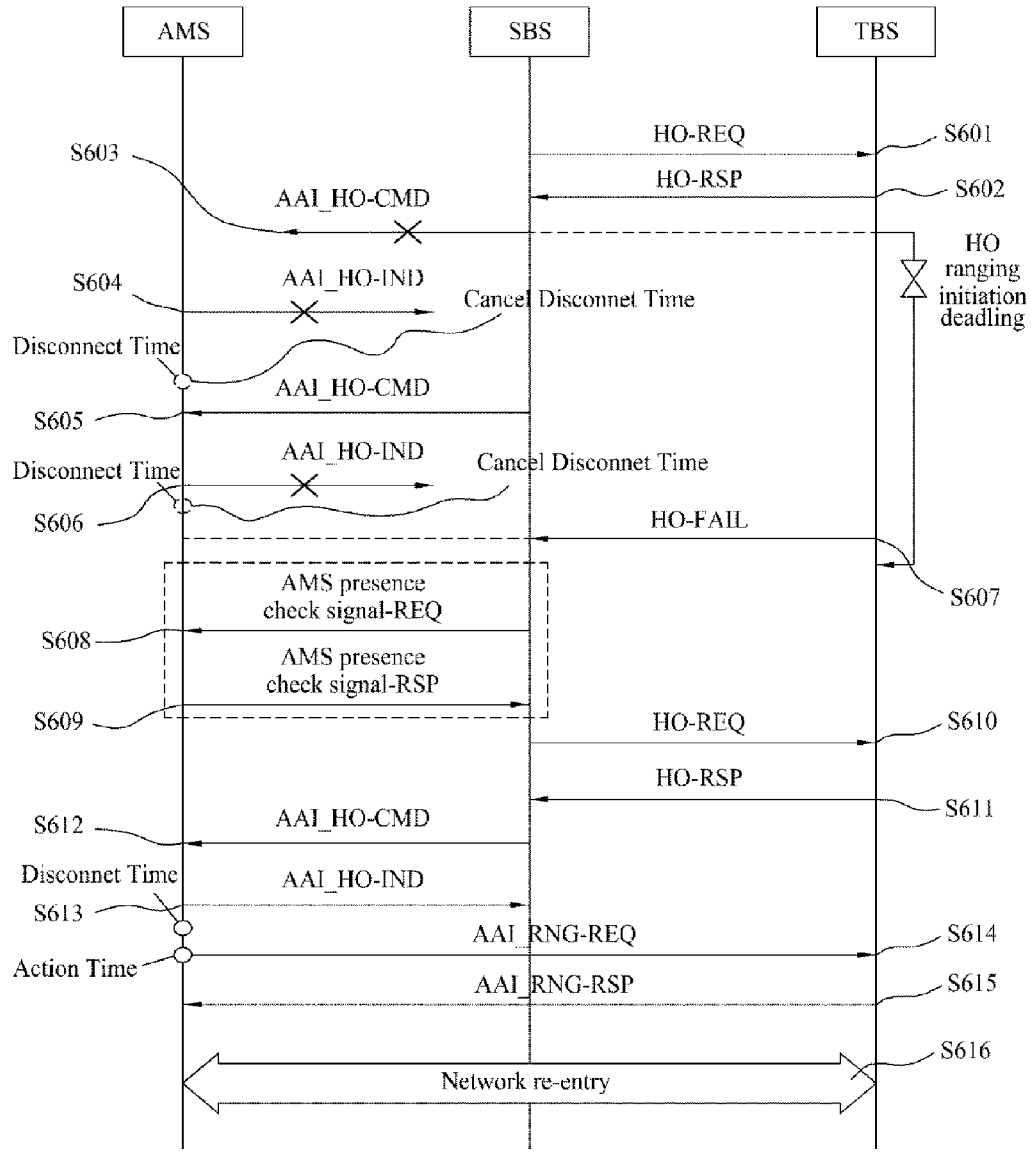
FIG. 6 is a flowchart illustrating yet another example of a presence check procedure when a response message for an HO indication message is requested according to one embodiment of the present invention.

FIG. 6 is a flowchart illustrating yet another example of a presence check procedure when a response message for an HO indication (AAI_HO-IND) message is requested according to one embodiment of the present invention.

Referring to FIG. 6, the SBS may decide whether to perform HO of the AMS according to a predetermined condition, such that the HO-REQ message and the HO-RSP message may be exchanged with the TBS at steps S601 and S602.

The SBS may transmit the AAI_HO-CMD message to the AMS so as to command the AMS to perform HO, but the AMS does not successfully receive the AAI_HO-CMD message at step S603. Therefore, a response message to the AAI_HO-IND message is not transmitted to the SBS at step S604.

If the SBS does not receive the HO-RSP message from the AMS before reaching a predetermined time, it updates a disconnect time, and retransmits the AAI_HO-IND message to the AMS a predetermined number of times until receiving a response message to the AAI_HO-IND message at step S605. Although the SBS retransmits the AAI_HO-CMD message the predetermined number of times, it does not receive a response message to the AAI_HO-CMD message from the AMS at step S606. If the TBS informs the SBS of the HO failure (e.g., HO_FAIL message) through the backbone network (backhaul) according to the lapse of the Ranging_Initiation_Deadline at step S607, the SBS may perform the presence check procedures at steps S608 and S609.

Steps S610 to S616 to be performed after the presence check procedure has been successfully completed are similar to other steps S407 to S411 of FIG. 4, and as such the same parts of FIG. 6 will herein be omitted for convenience of description.

In accordance with another aspect of the present invention, the presence check procedure may also be applied to handover (HO) of an Entry Before Break (EBB) type, and a detailed description thereof will hereinafter be described with reference to FIG. 7.

Figure 7:
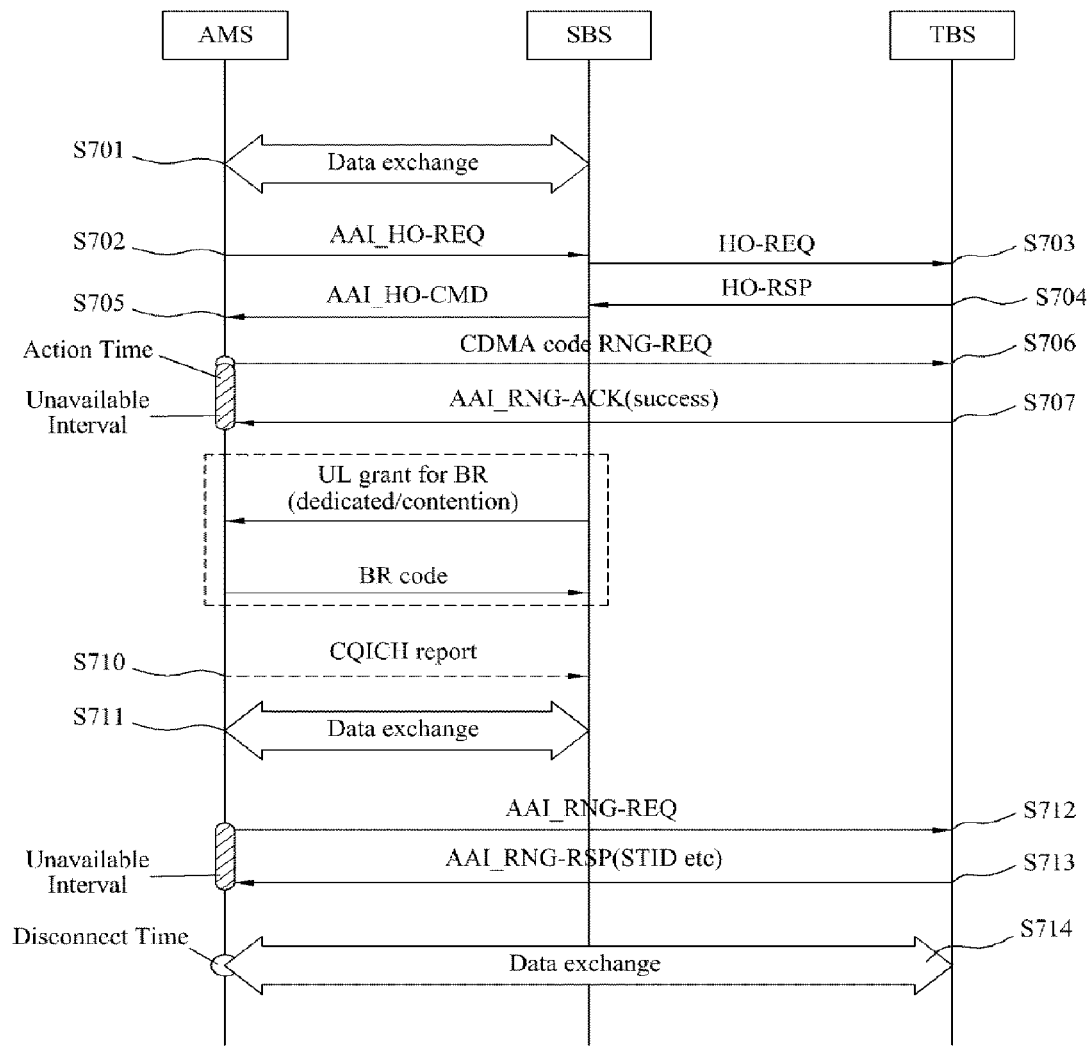
FIG. 7 is a flowchart illustrating a presence check procedure for an Entry Before Break (EBB) handover according to one embodiment of the present invention.

FIG. 7 is a flowchart illustrating a presence check procedure for an Entry Before Break (EBB) handover according to one embodiment of the present invention.

Referring to FIG. 7, while the AMS normally exchanges data with the SBS at step S701, the AMS decides to initiate HO according to a predetermined condition, and transmits the AAI_HO-REQ message to the SBS at step S702.

Accordingly, the SBS may exchange HO information with the TBS through the HO-REQ message and the HO-RSP message at steps S703 and S704.

The SBS transmits the AAI_HO-CMD message to the AMS at step S705. In this case, the AAI_HO-CMD message may include EBB HO adjustment information and information of an action time at which network re-entry to the TBS begins.

The EBB HO adjustment information may include information about a non-communication interval in which the AMS does not communicate with the SBS according to the SBS scheduling, i.e., information about an HO re-entry interleaving interval (HO_Reentry_Interleaving_Interval) or information about an unavailable interval.

The AMS may transmit an HO ranging code to the TBS using the unavailable interval at step S706. In response to the HO ranging code, the TBS may transmit a ranging acknowledgement (AAI_RNG-ACK) message including a physical correction value and the success or failure of the ranging to the AMS at step S707.

After the unavailable interval has expired, the SBS schedules the AMS until reaching the next unavailable interval. In this case, the SBS does not know whether the AMS is present in coverage of the SBS, such that it may perform the presence check procedures so as to prevent resources from being unnecessarily allocated to the corresponding AMS at steps S708 and S709.

In this case, as another method for performing the presence check procedure, the AMS may also transmit a report of a dedicated Channel Quality Indicator Channel (CQICH) to the SBS through the CQICH without receiving any request at step S710.

If the presence check procedure has been successfully performed, the SBS allocates resources to the AMS such that it may exchange data with the AMS at step S711.

If a current time reaches a next unavailable interval, the AMS may perform the remaining HO procedures in association with the TBS in the next unavailable interval at steps S712 to S714. The remaining HO procedure is similar to a general HO procedure, and as such a detailed description thereof will herein be omitted for convenience of description.

Mobile Station (MS) and Base Station (BS) Structure

Now a description will be given of an MS and a BS (femto BS (FBS) and macro BS (MBS)) for implementing the above-described exemplary embodiments of the present invention, according to another exemplary embodiment of the present invention.

The MS may operate as a transmitter on an uplink and as a receiver on a downlink, while the BS may operate as a receiver on the uplink and as a transmitter on the downlink. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 8.

Figure 8:
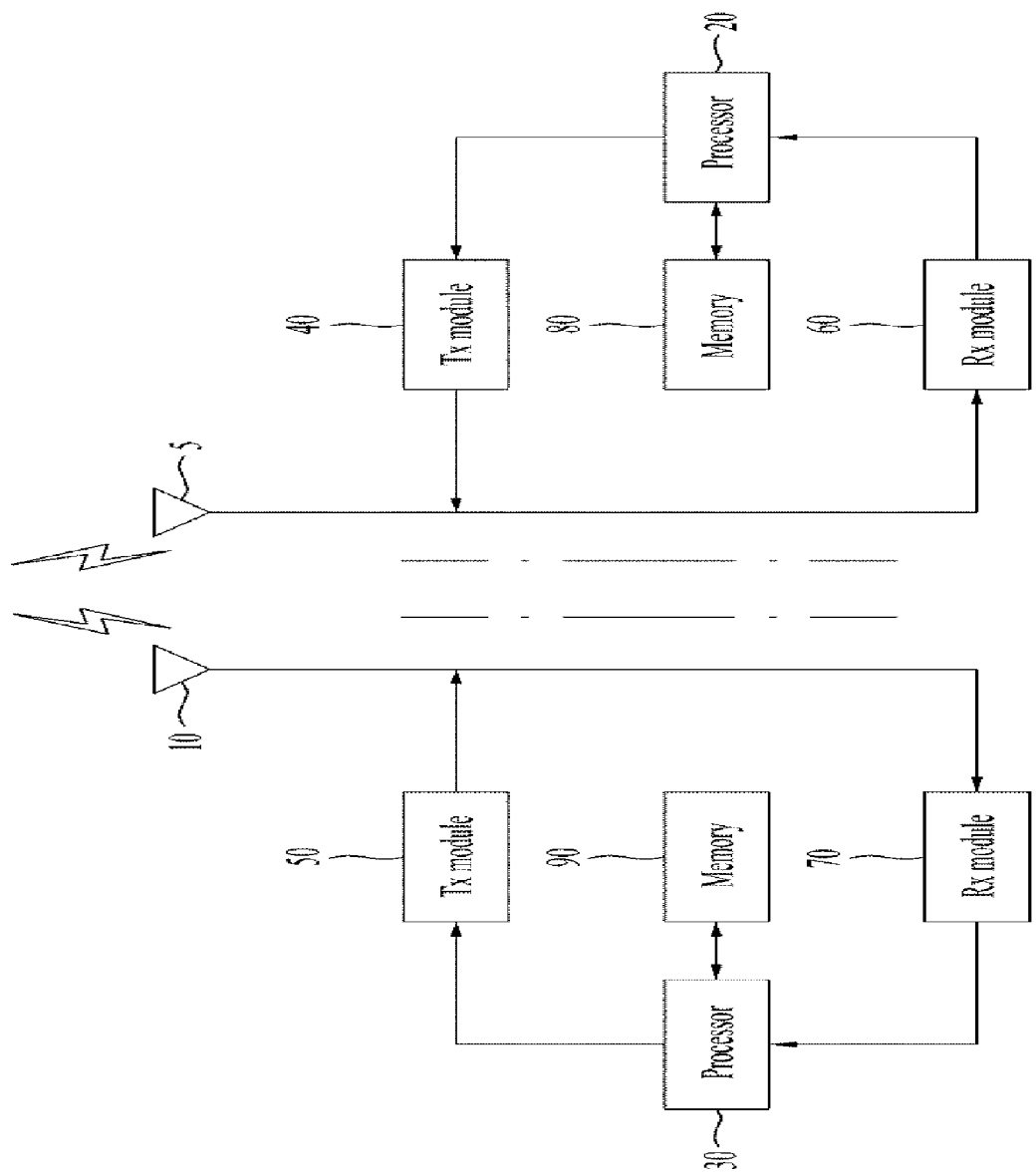
FIG. 8 is a block diagram illustrating a transmitter and a receiver according to another embodiment of the present invention.

FIG. 8 is a block diagram of a transmitter and a receiver according to another exemplary embodiment of the present invention.

Referring to FIG. 8, the left part corresponds to the transmitter and the right part corresponds to the receiver. Each of the transmitter and the receiver may include an antenna 5 or 10, a processor 20 or 30, a Transmission (Tx) module 40 or 50, a Reception (Rx) module 60 or 70, and a memory 80 or 90. The components of the transmitter are the counter parts of those of the receiver. The components of the transmitter and the receiver will be described below in more detail.

The antennas 5 and 10 include Tx antennas for transmitting signals generated from Tx modules 40 and 50 and Rx antennas for receiving radio frequency (RF) signals and providing the received RF signals to the Rx modules 60 and 70. If Multiple Input Multiple Output (MIMO) is supported, two or more antennas may be provided.

Each of the antenna, the Tx module, and the Rx module may include an RF module therein.

The processors 20 and 30 generally provide overall control to the MS. Especially, the processors 20 and 30 may perform a controller function for implementing the above-described exemplary embodiments of the present invention, a variable MAC frame control function based on service characteristics and a propagation environment, a handover (HO) function, an authentication and encryption function, etc. In more detail, the processors 20 and 30 may provide over control to the HO procedure shown in FIGS. 3 to 7.

Specifically, if the processor of the AMS receives a presence check request from the SBS during the HO procedure, the AMS processor transmits a response to the presence check request type to the SBS, thereby carrying out the presence check procedure.

In addition, if a specific bit indicating transmission of the response message is established in the AAI_HO-CMD message, or if transmission of a response message to the AAI_HO-CMD message is always pre-engaged, a corresponding message may be transmitted to the SBS.

Further, the AMS processor may provide overall control to the operations described in the above-mentioned embodiments.

The Tx modules 40 and 50 may encode and modulate transmission data scheduled by the processors 20 and 30 according to a predetermined coding and modulation scheme and provide the modulated data to the antenna 10.

The Rx modules 60 and 70 may recover original data by demodulating and decoding data received through the antennas 5 and 10 and provide the recovered data to the processors 20 and 30.

The memories 80 and 90 may store programs for processing and control of the processors 20 and 30 and temporarily store input/output (I/O) data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The exemplary embodiments of the present invention are applicable to various wireless access systems. The exemplary embodiments of the present invention have the following effects. First, more reliable handover (HO) can be carried out because an interruption time is minimized. Second, a serving base station (SBS) confirms the presence or absence of a mobile station (MS) although a MAC message is lost between the SBS and the MS during an HO procedure, resulting in the implementation of a more reliable HO procedure.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for performing a presence check procedure carried out by a mobile station (MS) during handover in a broadband wireless access system, the method comprising:
   receiving a first signal for a presence check request from a serving base station (BS);
   transmitting a second signal to the serving BS in response to the presence check request;
   receiving a ranging acknowledgement (AAI_RNG-ACK) message indicating a ranging success status from the serving BS; and
   transmitting a ranging confirmation (AAI_RNG-CFM) message including an identifier (ID) of the MS to the serving B,
   wherein the first signal is received if the MS has failed a network reentry to a target BS after a lapse of a disconnect time indicating a time point at which the serving BS stops communication with the MS,
   wherein the first signal is an unsolicited ranging response (unsolicited AAI_RNG-RSP) message in which a specific bit required for requesting a ranging process from the MS is set, and
   wherein the second signal is a periodic ranging code.

2. A method for performing a presence check procedure carried out by a serving base station (BS) during handover of a broadband wireless access system, the method comprising:
   transmitting a first signal for a presence check request to a mobile station (MS);
   receiving a second signal from the MS in response to the presence check request;
   transmitting a ranging acknowledgement (AAI_RNG-ACK) message indicating a ranging success status to the MS if the periodic ranging code is successfully received; and
   receiving a ranging confirmation (AAI_RNG-CFM) message including an identifier (ID) of the MS from the MS,
   wherein the first signal is transmitted if the serving BS detects a failure of a network reentry to a target BS of the MS after a lapse of a disconnect time indicating a time point at which the serving BS stops communication with the MS,
   wherein the first signal is an unsolicited ranging response (unsolicited AAI_RNG-RSP) message in which a specific bit required for requesting a ranging process from the MS is set, and
   wherein the second signal is a periodic ranging code.

3. A mobile station (MS) operated in a broadband wireless access system, the MS comprising:
   a processor; and
   a radio frequency (RF) module for transmitting and receiving an RF signal to and from an external part under the control of the processor,
   wherein the processor is configured to transmit a second signal to the serving BS in response to the presence check request if a first signal for a presence check request from a serving base station (BS) is received,
   wherein the first signal is received if the MS has failed a network reentry to a target BS after a lapse of a disconnect time indicating a time point at which the serving BS stops communication with the MS, during a handover procedure, wherein the first signal is an unsolicited ranging response (unsolicited AAI_RNG-RSP) message in which a specific bit required for requesting a ranging process from the MS is set, wherein the second signal is a periodic ranging code, and wherein the processor controls a ranging confirmation (AAI_RNG-CFM) message including an identifier (ID) of the MS to be transmitted to the serving BS upon receiving a ranging acknowledgement (AAI_RNG-ACK) message indicating a ranging success status from the serving BS.

* * * * *